United States Patent [19]

Codan et al.

[11] Patent Number: 5,564,275
[45] Date of Patent: Oct. 15, 1996

[54] METHOD AND APPARATUS FOR HIGH-PRESSURE END EXHAUST GAS RECIRCULATION ON A SUPERCHARGED INTERNAL COMBUSTION ENGINE

[75] Inventors: Ennio Codan, Hausen bei Brugg; Hansulrich Hörler, Zürich; Hansruedi Stebler, Nunningen; Markus Widenhorn, Oetwil, all of Switzerland

[73] Assignee: ABB Management AG, Baden, Switzerland

[21] Appl. No.: 543,383

[22] Filed: Oct. 16, 1995

[30] Foreign Application Priority Data

Oct. 14, 1994 [DE] Germany ................. 44 36 732.5

[51] Int. Cl.⁶ ..................... F02B 37/00; F02M 25/07
[52] U.S. Cl. .................................... 60/605.2
[58] Field of Search .............. 60/605.2; 123/568

[56] References Cited

U.S. PATENT DOCUMENTS

| | | | |
|---|---|---|---|
| 4,231,225 | 11/1980 | Aya | 60/605.2 |
| 4,496,291 | 1/1985 | Grimmer | |
| 4,696,270 | 9/1987 | Pischinger | |
| 4,756,285 | 7/1988 | Pischinger | |
| 5,406,796 | 4/1995 | Hiereth et al. | 60/605.2 |

FOREIGN PATENT DOCUMENTS

| | | | |
|---|---|---|---|
| 2855687 | 6/1979 | Germany | |
| 4209469 | 4/1993 | Germany | |
| 4231218 | 9/1993 | Germany | |
| 4320045 | 7/1994 | Germany | |
| 4312462 | 10/1994 | Germany | |
| 5-71426 | 3/1993 | Japan | 60/605.2 |

OTHER PUBLICATIONS

Patent Abstracts of Japan, vol. 950, No. 004, JP-A-07 091325, Apr. 4, 1995.
MTZ Motortechnisch Zeitschrift, vol. 53, No. 3, Von Jochen Eitel, Mar. 1, 1992, p. 114, "Ladeluftkuhlung mit Niedertemperatur–Kuhlmittelkreislaufen fur Kraftfahrzeug–Verbrennungsmotoren".

Primary Examiner—Michael Koczo
Attorney, Agent, or Firm—Oblon, Spivak, McClelland, Maier & Neustadt, P.C.

[57] ABSTRACT

A method and apparatus for high-pressure end exhaust gas recirculation on a supercharged internal combustion engine which is relatively simple, low in cost and increases the efficiency of the engine. This is achieved by a third exhaust gas flow of the internal combustion engine expanding separately from a first exhaust gas flow and by providing power to compress a second exhaust gas flow. For this purpose, a turbine is arranged as the drive for the exhaust gas compressor. The exhaust gas duct system has a third exhaust gas duct connected to the turbine.

2 Claims, 1 Drawing Sheet

METHOD AND APPARATUS FOR HIGH-PRESSURE END EXHAUST GAS RECIRCULATION ON A SUPERCHARGED INTERNAL COMBUSTION ENGINE

BACKGROUND OF THE INVENTION

1. Field of the Invention

The invention relates to a method and an apparatus for high-pressure end exhaust gas recirculation on an internal combustion engine combined with a turbocharger.

2. Discussion of Background

Exhaust gas recirculation at the high-pressure end of a supercharged internal combustion engine with a negative scavenging drop, i.e. with a small charge air pressure relative to a higher exhaust gas backpressure after the cylinder, is realized by simply connecting the exhaust gas duct system to the charge air duct system. In the case of a positive scavenging drop, however, such a connection is substantially more complicated because the pressure drop in the reverse direction has to be overcome.

An internal combustion engine with an exhaust gas turbocharger which is known from DE-C1 42 09 469 permits the exhaust gas recirculation in the case of a negative scavenging drop and, more particularly, in the case of a positive scavenging drop also. In this solution, the turbine of the exhaust gas turbocharger is configured in such a way that it compresses some of the exhaust gases of the internal combustion engine in order to overcome the pressure drop relative to the charge air pressure. The compressed exhaust gases are introduced into the inlet duct of the internal combustion engine by means of an exhaust gas recirculation duct between the charge air cooler and the compressor of the exhaust gas turbocharger.

This solution, however, requires a complicated and specially configured turbine with an integrated exhaust gas compressor part. It is therefore impossible to employ commercial exhaust gas turbochargers. Because the compression energy necessary increases with the induction temperature and an exhaust gas compressor part integrated into the turbine cannot be designed in an optimum manner, a very high expenditure of energy is required for such compression. This reduces the attainable efficiency of the exhaust gas recirculation.

A supercharged internal combustion engine is known from DE-A1 43 20 045 in which the disadvantages mentioned above are substantially obviated. For this purpose, the exhaust gases are subdivided into a plurality of exhaust gas flows. The first exhaust gas flow is fed into the exhaust gas turbine of the exhaust gas turbocharger. A second exhaust gas flow is led back to the internal combustion engine in a separate exhaust gas duct. In this arrangement, the second exhaust gas flow is initially cooled before entering the internal combustion engine and is subsequently recompressed. In order to limit the charge pressure, a third exhaust gas flow is led away directly to the exhaust gas system via a by-pass duct.

The consequence of removal without use of some of the exhaust gases is, however, an energy loss which lowers the possible efficiency of the exhaust gas recirculation. Another disadvantage of this solution is that the compressor for the second exhaust gas flow is driven by the internal combustion engine. This lowers the efficiency of the internal combustion engine. The drive for the compressor takes place by means of a gear which is separately connected to the crankshaft of the internal combustion engine. This gear substantially increases the technical outlay for the exhaust gas recirculation and, therefore, the costs as well. The outlay is additionally increased by the multiplicity of control valves and the control system necessary for them. In addition, the mechanical exhaust gas compressor coupled to the crankshaft supplies an exhaust gas quantity which is not, generally speaking, proportional to the air quantity induced by the internal combustion engine. In order to realize a constant exhaust gas recirculation rate even in the case of changing loads, a strongly correcting and therefore complicated control system is necessary.

SUMMARY OF THE INVENTION

Accordingly, one object of the invention is to avoid all these disadvantages and to provide a novel, relatively simple and low-cost method and a corresponding apparatus for high-pressure end exhaust gas recirculation on an internal combustion engine combined with a turbocharger and, by this means, to increase the efficiency of the internal combustion engine.

In accordance with the invention, this is achieved by a method wherein a third exhaust gas flow of the internal combustion engine is expanded separately from the first exhaust gas flow and, by this means, provides the power to compress the second exhaust gas flow. For this purpose, a turbine is arranged as the drive for the exhaust gas compressor. The exhaust gas duct system has a third exhaust gas duct connected to the turbine.

In this method, and by means of the corresponding apparatus, the efficiency of the exhaust gas recirculation is increased because none of the exhaust gases leaves the system unused. The system for this exhaust gas recirculation has a characteristic which provides almost constant exhaust gas recirculation rates so that, at most, only small control interventions are necessary. This makes the system more efficient in terms of energy and the charge exchange operation of the internal combustion engine also improves.

The conversion of the energy surplus in a second turbine is substantially more efficient than the use of the pressure difference in the cylinder of the internal combustion engine. This method therefore permits a marked reduction in the total fuel consumption.

It is, furthermore, advantageous for at least two compression and expansion processes to be carried out on the second and third exhaust gas flows. The compression processes take place in parallel with one another and the expansion processes take place in series one after the other. For this purpose, at least two exhaust gas compressors are arranged in the second exhaust gas duct. Each exhaust gas compressor is connected to a turbine to form a turbocharger. The exhaust gas compressors are connected in parallel and the turbines are connected in series.

In the design of a turbocharger, the relationship between the turbine area and the compressor volume flow is decisive. The special arrangement of the turbochargers effects a corresponding subdivision of the relatively large volume of the second exhaust gas flow in the region before the compression. Similarly, the large pressure ratios during the expansion of the third exhaust gas flow are substantially reduced. For this reason, a normal relationship appears between the turbine area and the compressor volume flow. This is associated with the substantial advantage that commercial turbochargers can be used. Because the turbines and compressors of such turbochargers are matched to one another in terms of their speed, they can be operated in higher efficiency regions.

BRIEF DESCRIPTION OF THE DRAWINGS

A more complete appreciation of the invention and many of the attendant advantages thereof will be readily obtained as the same becomes better understood by reference to the following detailed description of two embodiment examples, referring to a supercharged internal combustion engine, when considered in connection with the accompanying drawings, wherein.

DESCRIPTION OF THE PREFERRED EMBODIMENTS

Figure 1:
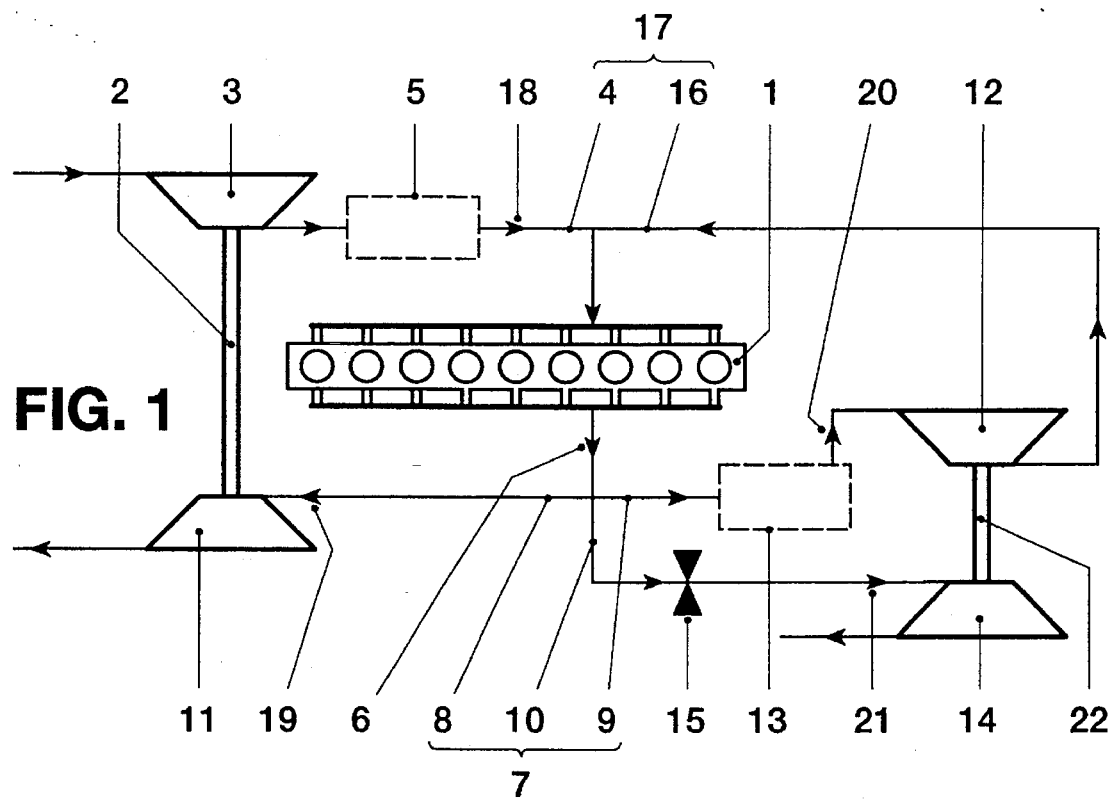
FIG. 1 shows a diagrammatic representation of the exhaust gas supercharging of an internal combustion engine, with exhaust gas recirculation.

Referring now to the drawings, wherein like reference numerals designate identical or corresponding parts throughout the views, wherein only the elements essential to understanding the invention are shown and wherein the flow direction of the working media is indicated by arrows, the internal combustion engine 1 is connected to the high-pressure end of an exhaust gas turbocharger 2. The latter's compressor 3 is connected to the internal combustion engine 1 by means of a charge air duct 4. A charge air cooler 5 is arranged in the charge air duct 4.

A branching exhaust gas duct system 7, which consists of three exhaust gas ducts 8, 9 and 10, is configured downstream of the internal combustion engine 1 and has exhaust gas 6 from the latter admitted to it. The first exhaust gas duct 8 is connected to the exhaust gas turbine 11 of the exhaust gas turbocharger 2 and the second exhaust gas duct 9 is connected to an exhaust gas compressor 12. An exhaust gas cooler 13 is arranged in the second exhaust gas duct 9. An additional turbine is configured as the drive 14 for the exhaust gas compressor 12 and the third exhaust gas duct 10 is connected to this additional turbine (FIG. 1). A control valve 15 can, if required, be arranged in this exhaust gas duct 10.

A charge air duct system 17 comprising the charge air duct 4 and an exhaust gas recirculation duct 16 is formed upstream of the internal combustion engine 1. The charge air duct 4 and the exhaust gas recirculation duct 16 are connected together downstream of the charge air cooler 5.

When the apparatus is being operated, charge air 18 (which is supercharged in the compressor 3 and cooled in the charge air cooler 5) is introduced into the internal combustion engine 1. After combustion, the exhaust gases 6 from the internal combustion engine 1 are subdivided in the exhaust gas duct system 7 into three exhaust gas flows 19, 20 and 21. The first exhaust gas flow 19 passes via the exhaust gas duct 8 into the exhaust gas turbine 11 where it expands and, in the process, drives the compressor 3 of the exhaust gas turbocharger 2. The second exhaust gas flow 20 is initially cooled in the exhaust gas cooler 13 and is subsequently supercharged in the exhaust gas compressor 12. The supercharging of the second exhaust gas flow 20 takes place with the aid of the third exhaust gas flow 21 which expands in the turbine 14 and, in the process, drives the exhaust gas compressor 12. The turbine 14 and the exhaust gas compressor 12 therefore form a turbocharger 22. The second exhaust gas flow 20, which has now been compressed, passes afresh into the internal combustion engine 1 via the exhaust gas recirculating duct 16 after it has first been mixed with the supercharged and cooled charge air 18. A further exhaust gas cooler can be arranged in the exhaust gas recirculation duct 16 before or after the exhaust gas compressor 12 in order to lower the temperature of the respectively exhaust gas flow 20 to an even greater extent. As an alternative to this, it is also possible to connect the exhaust gas recirculation duct 16 to the charge air duct 4 upstream of the charge air cooler 5.

Figure 2:
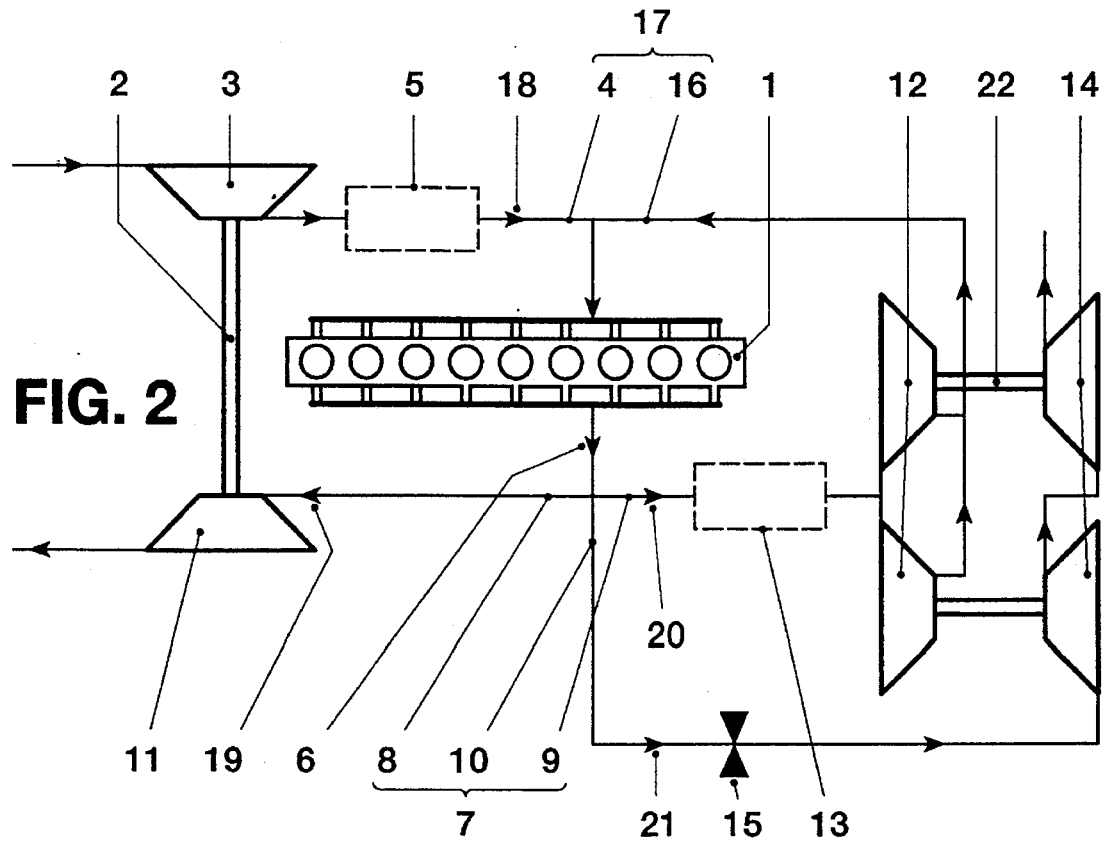
FIG. 2 shows a representation of the exhaust gas turbocharging shown in FIG. 1, but in a different embodiment.

In another embodiment example, two exhaust gas compressors 12 are arranged in the second exhaust gas duct 9 and are each connected to a turbine 14 to form two turbochargers 22. The exhaust gas compressors 12 are then arranged in parallel with one another and the turbines 14 are arranged in series one after the other (FIG. 2).

When this apparatus is operated, the large volume of the exhaust gas flow 20 is distributed between two exhaust gas compressors 12. The pressure relationships in the second exhaust gas duct 9 are, on the other hand, unproblematic because the pressure difference relative to the charge air duct system 17 is relatively small. The relatively large pressure difference between the exhaust gas duct system 7 and the ambient air is dealt with without problems by the arrangement of the turbines 14 in series one after the other. The volume of the exhaust gas flow 21 required to drive the turbines 14 can be adjusted by means of the control valve 15 arranged in the third exhaust gas duct 10.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for high-pressure end exhaust gas recirculation on a supercharged internal combustion engine, which comprises:

introducing compressed and cooled charge air into the internal combustion engine;

subdividing the exhaust gases into a plurality of exhaust gas flows;

expanding a first exhaust gas flow in an exhaust gas turbine and thereby driving the compressor of an exhaust gas turbocharger;

initially cooling a second exhaust gas flow, subsequently compressing the second exhaust gas flow and finally introducing the second exhaust gas flow into the internal combustion engine;

expanding a third exhaust gas flow of the internal combustion engine separately from the first exhaust gas flow for providing power to compress the second exhaust gas flow; and carrying out at least two compression and expansion processes of the second and third exhaust gas flow, the compression processes taking place in parallel with one another and the expansion processes taking place in series one after the other.

2. A high-pressure end exhaust gas recirculation apparatus on a supercharged internal combustion engine, which comprises:

a compressor of an exhaust gas turbocharger which is connected to the internal combustion engine by a charge air duct wherein a charge air cooler is arranged in the charge air duct;

a branching exhaust gas duct system located downstream of the internal combustion engine;

an exhaust gas duct system which includes a first exhaust gas duct connected to an exhaust gas turbine of the exhaust gas turbocharger and a second exhaust gas duct connected to an exhaust gas cooler and at least one exhaust gas compressor;

the at least one exhaust gas compressor including a drive and being connected to the charge air duct by an exhaust gas recirculation duct;

wherein the drive for the exhaust gas compressor comprises at least one turbine and the exhaust gas duct system has a third exhaust gas duct which is connected to the at least one turbine; and wherein the at least one exhaust gas compressor comprises two exhaust gas compressors which are arranged in the second exhaust gas duct, the at least one turbine comprising at least two turbines, each exhaust gas compressor is connected to one of the turbines, the exhaust gas compressors are arranged in parallel with one another and the turbines are arranged in series one after the other.

\* \* \* \* \*